United States Patent
Jin et al.

(10) Patent No.: US 8,908,304 B2
(45) Date of Patent: Dec. 9, 2014

(54) SYSTEMS AND METHODS FOR CHANNEL TARGET BASED CBD ESTIMATION

(75) Inventors: Ming Jin, Fremont, CA (US); Bruce A. Wilson, San Jose, CA (US); Steven L. Cochran, Longmont, CO (US)

(73) Assignee: LSI Corporation, San Jose, CA (US)

( * ) Notice: Subject to any disclaimer, the term of this patent is extended or adjusted under 35 U.S.C. 154(b) by 103 days.

(21) Appl. No.: 13/551,507

(22) Filed: Jul. 17, 2012

(65) Prior Publication Data
US 2014/0022664 A1 Jan. 23, 2014

(51) Int. Cl.
*G11B 27/36* (2006.01)
*G11B 5/09* (2006.01)

(52) U.S. Cl.
USPC .............................................. 360/31; 360/48

(58) Field of Classification Search
USPC ............... 360/39, 31, 75, 48, 46; 369/47.1, 369/124.01
See application file for complete search history.

(56) References Cited

U.S. PATENT DOCUMENTS

| | | | |
|---|---|---|---|
| 6,535,553 B1 | 3/2003 | Limberg et al. | |
| 7,248,630 B2 | 7/2007 | Modrie | |
| 7,257,764 B2 | 8/2007 | Suzuki | |
| 7,421,017 B2 | 9/2008 | Takatsu | |
| 7,502,189 B2 | 3/2009 | Sawaguchi | |
| 7,715,471 B2 | 5/2010 | Werner | |
| 8,018,360 B2 | 9/2011 | Nayak | |
| 8,046,666 B2 | 10/2011 | Park et al. | |
| 8,149,529 B2 * | 4/2012 | Mathew et al. | 360/46 |
| 8,154,818 B2 * | 4/2012 | Mathew et al. | 360/75 |
| 8,208,213 B2 | 6/2012 | Liu | |
| 2006/0123285 A1 | 6/2006 | De Araujo et al. | |
| 2009/0002862 A1 | 1/2009 | Park et al. | |
| 2011/0072335 A1 | 3/2011 | Liu et al. | |
| 2011/0075569 A1 | 3/2011 | Marrow et al. | |
| 2011/0164332 A1 | 7/2011 | Cao | |
| 2011/0167227 A1 | 7/2011 | Yang et al. | |
| 2012/0019946 A1 | 1/2012 | Aravind | |
| 2012/0056612 A1 | 3/2012 | Mathew | |
| 2012/0069891 A1 | 3/2012 | Zhang | |
| 2012/0124119 A1 | 5/2012 | Yang | |
| 2012/0236430 A1 | 9/2012 | Tan | |

OTHER PUBLICATIONS

U.S. Appl. No. 13/535,799, filed Jun. 28, 2012, Madhusudan Kalluri, Unpublished.
U.S. Appl. No. 13/525,188, filed Jun. 15, 2012, Yang Han, Unpublished.
U.S. Appl. No. 13/491,062, filed Jun. 7, 2012, Jin Lu, Unpublished.
U.S. Appl. No. 13/525,182, filed Jun. 15, 2012, Yang Han, Unpublished.
U.S. Appl. No. 13/346,556, filed Jan. 9, 2012, Haitao Xia, Unpublished.
U.S. Appl. No. 13/239,719, filed Sep. 22, 2011, Haitao Xia, Unpublished.
U.S. Appl. No. 13/272,209, filed Oct. 12, 2011, Yu Liao, Unpublished.
U.S. Appl. No. 13/545,784, filed Jul. 10, 2012, Yu Liao, Unpublished.

\* cited by examiner

*Primary Examiner* — Nabil Hindi
(74) *Attorney, Agent, or Firm* — Hamilton DeSanctis & Cha

(57) ABSTRACT

Various approaches, methods, systems, circuits and devices for channel bit density estimation.

22 Claims, 3 Drawing Sheets

1

SYSTEMS AND METHODS FOR CHANNEL TARGET BASED CBD ESTIMATION

BACKGROUND OF THE INVENTION

The present inventions are related to systems and methods for processing data, and more particularly to systems and methods for channel bit density estimation.

Channels are calibrated to assure acceptable data transfer and processing characteristics. Various calibrations rely on channel bit density information. As an example, channel bit density may be optimized based upon the channel bit density information. Such channel bit density information, however, can be difficult and costly to estimate accurately.

Hence, for at least the aforementioned reasons, there exists a need in the art for advanced systems and methods for data processing.

BRIEF SUMMARY OF THE INVENTION

The present inventions are related to systems and methods for processing data, and more particularly to systems and methods for channel bit density estimation.

Various embodiments of the present invention provide data processing circuits that include channel bit density (CBD) estimation circuitry. Such CBD estimation circuitry may rely on determining a one half pulse width based upon target values, and estimating CBD based on the one half pulse width. In other cases, the CBD estimation circuitry may rely on up-sampling a Dibit pulse, and calculating an estimated CBD based upon the up-sampled Dibit pulse. This estimated CBD value may then be used for one or more calibrations or characterizations as are known in the art.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS OF THE INVENTION

The present inventions are related to systems and methods for processing data, and more particularly to systems and methods for retrying a previously failed data processing.

Various embodiments of the present invention provide data processing circuits that include channel bit density (CBD) estimation circuitry. Such CBD estimation circuitry may rely on determining a one half pulse width based upon target values, and estimating CBD based on the one half pulse width. In other cases, the CBD estimation circuitry may rely on up-sampling a Dibit pulse, and calculating an estimated CBD based upon the up-sampled Dibit pulse. This estimated CBD value may then be used for one or more calibrations or characterizations as are known in the art.

Figure 1:
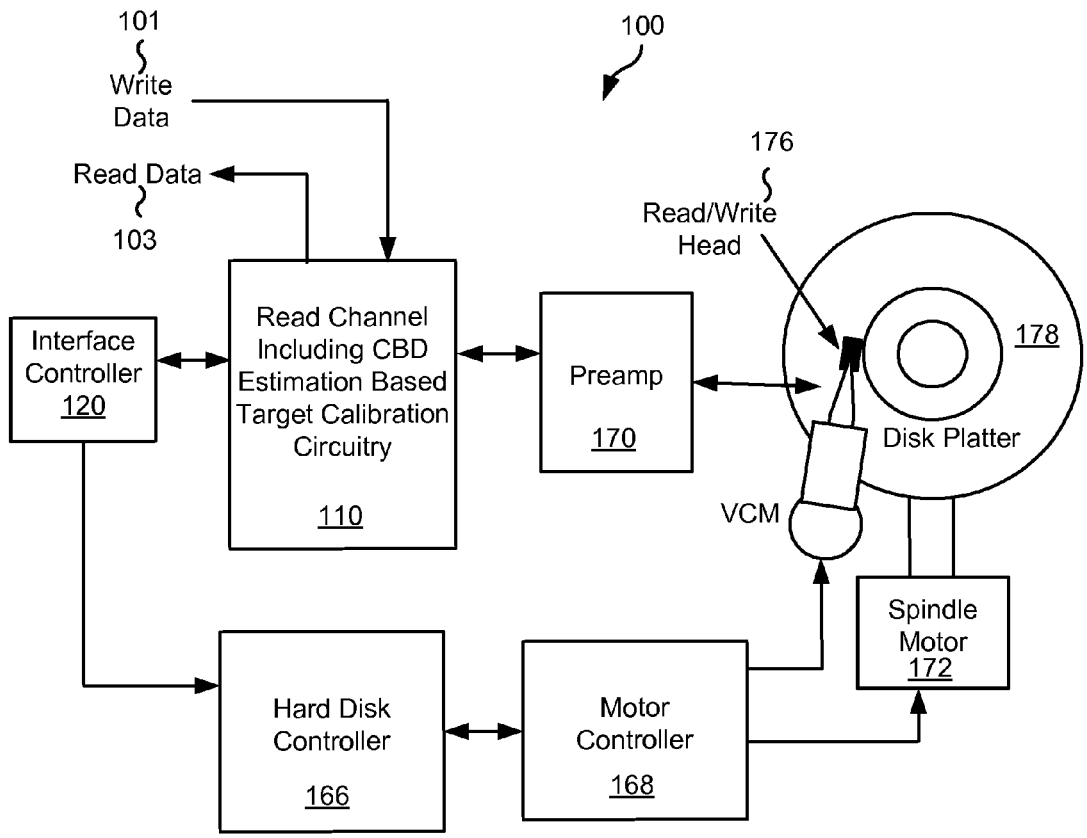
FIG. 1 shows a storage system including a read channel circuit having CBD estimation circuitry in accordance with some embodiments of the present invention.

Turning to FIG. 1, a storage system 100 including a read channel circuit 110 having CBD estimation circuitry is shown in accordance with one or more embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176 that incorporates a magneto-resistive head. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During operation, CBD estimation may be performed using a combination of a data set read from disk platter 178 and a corresponding known pattern. Such an approach may be done using circuitry similar to that discussed below in relation to FIG. 3 and FIG. 4, and/or using the method discussed below in relation to FIG. 6. Alternatively, the approach may be done using the method discussed below in relation to FIG. 5.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

The data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
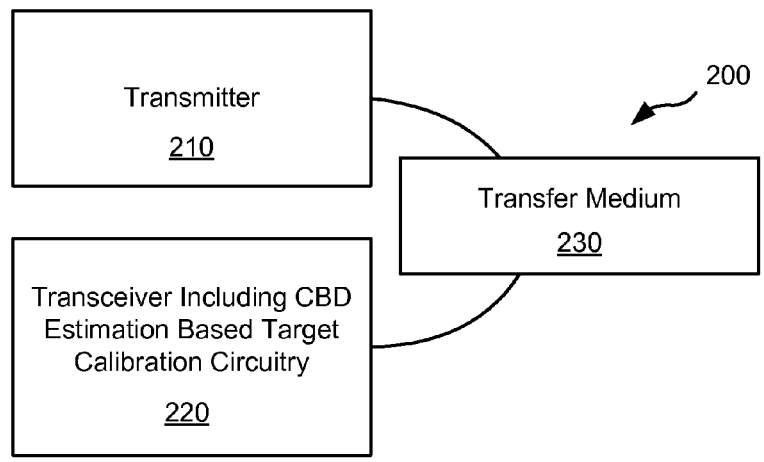
FIG. 2 depicts a communication system including a receiver having CBD estimation circuitry in accordance with various embodiments of the present invention.

Turning to FIG. 2, a communication system 200 including a receiver 220 having digital MRA compensation circuitry is shown in accordance with some embodiments of the present invention. Communication system 200 includes a transmitter 210 that is operable to transmit encoded information via a transfer medium 230 as is known in the art. The encoded data is received from transfer medium 230 by receiver 220. Transfer medium 230 may be any transfer medium known in the art including, but not limited to, a wireless medium, a wired medium, storage medium, an optical medium, or the like. Based upon the disclosure provided herein, one of ordinary skill in the art will recognize a variety of transfer mediums that may be used in relation to different embodiments of the present invention.

During operation, CBD estimation may be performed using a combination of a data set read from disk platter 178 and a corresponding known pattern. Such an approach may be done using circuitry similar to that discussed below in relation to FIG. 3 and FIG. 4, and/or using the method discussed below in relation to FIG. 6. Alternatively, the approach may be done using the method discussed below in relation to FIG. 5.

Figure 3:
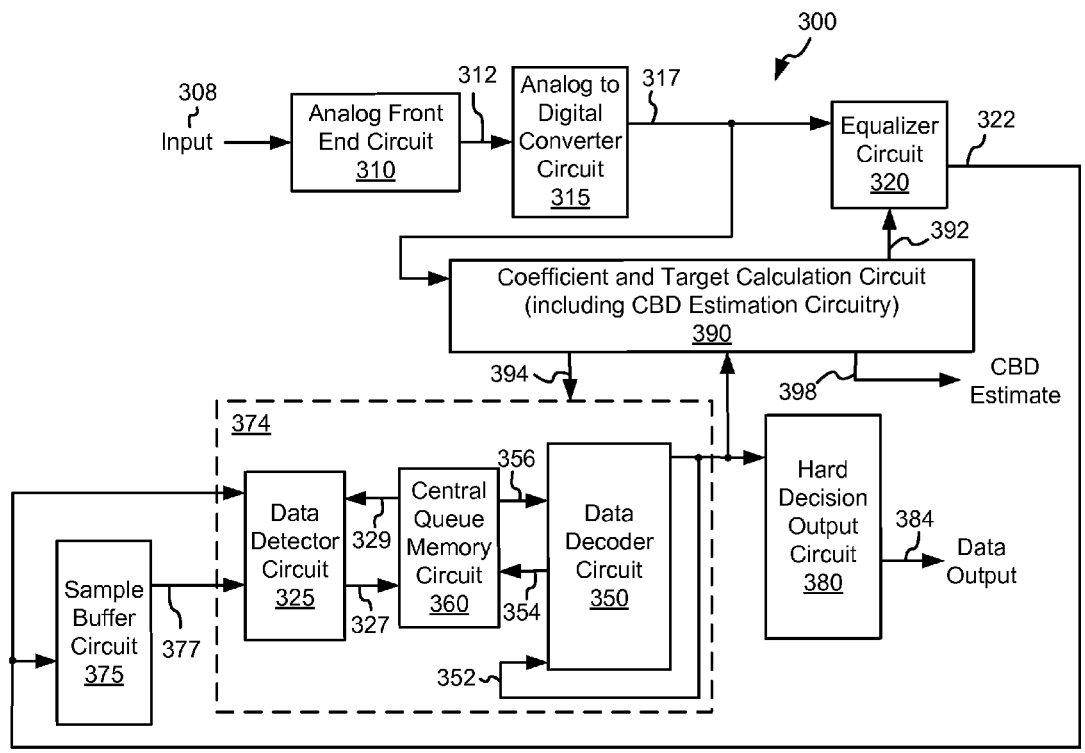
FIG. 3 depicts a data processing circuit including a coefficient and target calculation circuit in accordance with some embodiments of the present invention.

Turning to FIG. 3, a data processing circuit 300 including a coefficient and target calculation circuit 390 is shown in accordance with some embodiments of the present invention. Data processing circuit 300 includes an analog front end circuit 310 that receives an analog input 308. Analog front end circuit 310 processes analog input 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input 308 is derived from a read/write head assembly (not shown) that is disposed in relation to a storage medium (not shown). In other cases, analog input 308 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322. In some embodiments of the present invention, equalizer circuit 320 is a digital finite impulse response filter circuit as are known in the art.

In addition, digital samples 317 are provided to coefficient and target calculation circuit 390. As more fully discussed below, coefficient and target calculation circuit 390 is operable to calculate target values 394 provided to a data detection and decoding circuit 374, coefficient values 392 provided to equalizer circuit 320, and a CBD estimate 398. The operation of equalizer circuit 320 is at least in part governed by coefficient values 392, and data detection and decoding circuit 374 is at least in part based on target values 394. Data detection and decoding circuit 374 includes a data detector circuit 325, a central queue memory circuit 360, and a data decoder circuit 350.

Equalized output 322 is provided to both data detector circuit 325 and to a sample buffer circuit 375. Sample buffer circuit 375 stores equalized output 322 as buffered data 377 for use in subsequent iterations through data detector circuit 325. Data detector circuit 325 may be any data detector circuit known in the art that is capable of producing a detected output 327. As some examples, data detector circuit 325 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 327 may include both hard decisions and soft decisions. The terms "hard decisions" and "soft decisions" are used in their broadest sense. In particular, "hard decisions" are outputs indicating an expected original input value, and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. In some cases, central queue memory circuit 360 includes interleaving (i.e., data shuffling) and de-interleaving (i.e., data un-shuffling) circuitry known in the art. When data decoder circuit 350 is available, data decoder circuit 350 accesses detected output 327 from central queue memory circuit 360 as a decoder input 356. Data decoder circuit 350 applies a data decoding algorithm to decoder input 356 in an attempt to recover originally written data. Data decoder circuit 350 may be any data decoder circuit known in the art that is capable of applying a decoding algorithm to a received input. Data decoder circuit 350 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention.

A resulting decoded output 352 is provided from data decoder circuit 350 upon completing application of the data decode algorithm. Similar to detected output 327, decoded output 352 may include both hard decisions and soft decisions. Where the original data is recovered (i.e., the data decoding algorithm converges) or a timeout condition occurs, decoded output 352 is stored to a memory included in a hard decision output circuit 380. In turn, hard decision output circuit 380 provides the converged decoded output 352 as a data output 384 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention.

One or more iterations through the combination of data detector circuit 325 and data decoder circuit 350 may be made in an effort to converge on the originally written data set. Processing through both the data detector circuit and the data decoder circuit is referred to as a "global iteration". In contrast, each pass through the data decoder circuit is referred to as a "local iteration". For the first global iteration, data detector circuit 325 applies the data detection algorithm to equalized output 322 without guidance from a decoded output. For subsequent global iterations, data detector circuit 325 applies the data detection algorithm to buffered data 377 as guided by decoded output 352. Decoded output 352 is stored to central queue memory circuit 360 as a decoder output 354, and is provided from central queue memory circuit 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from decoded output 352. For subsequent local iterations, data decoder circuit 350 applies the data decoding algorithm to decoder input 356 as guided by a previous decoded output 352. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 350 exceeds that allowed, but it is determined that at least one additional global iteration during standard processing of the data set is allowed, decoded output 352 is provided back to central queue memory circuit 360 as decoded output 354. Decoded output 354 is maintained in central queue memory circuit 360 until data detector circuit 325 becomes available to perform additional processing.

In contrast, where the number of local iterations through data decoder circuit 350 exceeds that allowed and it is determined that the allowable number of global iterations has been surpassed for the data set and/or a timeout or memory usage calls for termination of processing of the particular data set, processing of the data set concludes and the decoded output is provided as data output 352 with an indication that the output is unusable.

Figure 7:
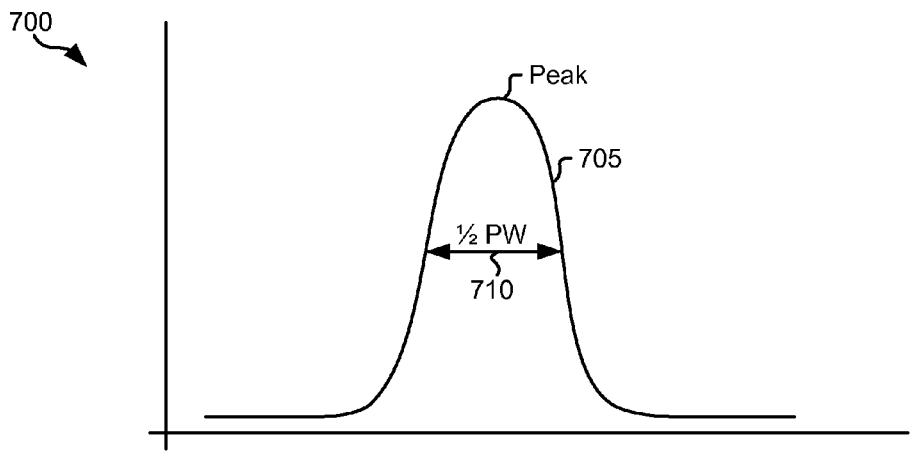
FIG. 7 graphically depicts a pulse from which CBD estimation may be performed in accordance with the methods of both FIG. 6 and FIG. 7.

In one embodiment of the present invention, coefficient and target calculation circuit 390 is operable to estimate a channel bit density based upon a Dibit pulse. This estimated channel bit density is provided as CBD estimate 398, and used to calculate one or both of target values 394 and coefficient values 392. Target values 394 and coefficient values 392 may be calculated base upon the estimated channel bit density using any algorithm or approach known in the art. An example of such a Dibit pulse is shown as pulse 705 of a timing diagram of FIG. 7. In estimating the channel bit density, the received Dibit pulse is up-sampled. The Dibit pulse corresponds to a sampling rate L, and the up-sampled or over-sampling rate is Q where Q is a multiple of L. The over-sampling (OSR) is thus defined by the following equation:

$$OSR = Q/L.$$

Using the over-sampled Dibit pulse (OS_Pulse), a first estimate of channel bit density (CBD') may be calculated in accordance with the following pseudocode:

```
CBD' = 0; //initialize the estimated channel bit density//
For i = 0 to n {     //repeat over all samples corresponding to the
Dibit pulse //
    If (OS_Pulse[i] > 0.5 Peak_Pulse){
        CBD' = CBD' + OS_Pulse/Peak_Pulse;
    }
    CBD' = CBD'/OSR.
}
```

In the preceding pseudocode, Peak_Pulse corresponds to the maximum value of OS_Pulse over the interval for i=0 to i=n samples, and the 0.5 Peak_Pulse corresponds to the width of the Dibit pulse at the one half peak value. The Peak Pulse corresponds to the "Peak" identified on pulse 700 of FIG. 7, and the 0.5 Peak Pulse corresponds to a width 710 of pulse 700 of FIG. 7.

The first estimate of channel bit density (CBD') may exhibit some offset from an actual channel bit density. In some cases, the channel may be tested to determine the fixed offset by measuring actual channel bit density and comparing it with the first estimate of channel bit density. This fixed offset remains substantially constant over a range of operating conditions. Once established, a second estimate of channel bit density (CBD") may be calculated in accordance with the following equation:

$$CBD'' = CBD' + \text{Fixed Offset}.$$

The second estimate of channel bit density is provided as CBD estimate 398.

In other embodiments of the present invention, coefficient and target calculation circuit 390 is operable to estimate a channel bit density based upon digital samples 317 and a corresponding known pattern. In some cases, the known pattern is provided to data processing circuit 300. In other cases, such as that shown in FIG. 3, the known pattern is the converged result from data decoder circuit 350 (decoded output 352). In this embodiment, digital samples 317 are equalized using an equalizer circuit (not shown) using coefficient values 392 that is substantially the same as equalizer circuit 320 to yield an equalized output (y), and decoded output 352 is processed through a target filter (not shown) using target values 394 to yield a target output (d). The target output (d) is subtracted from the equalized output (y) to yield an error output. Target values 394 and coefficient values 392 are adjusted such that the error value is reduced.

Figure 4:
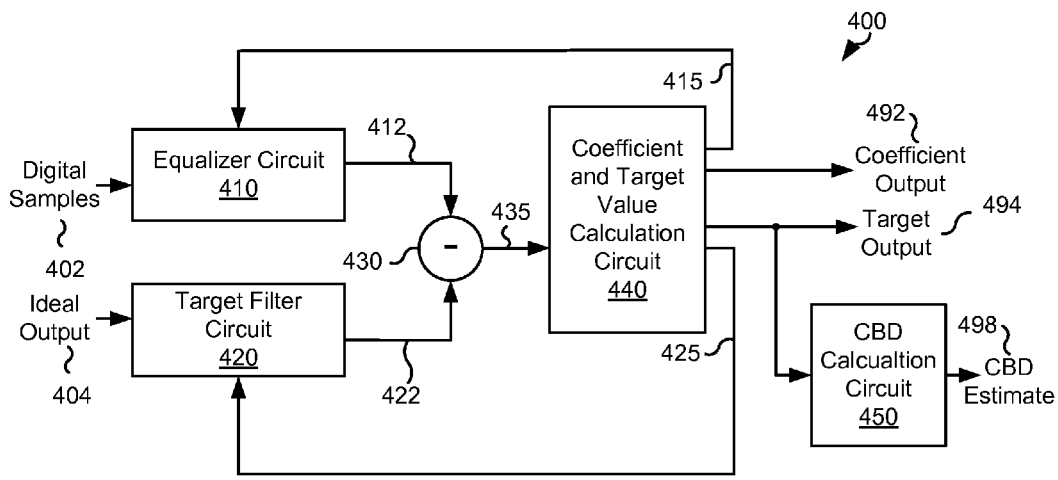
FIG. 4 shows one implementation of the coefficient and target calculation circuit of FIG. 3 in accordance with various embodiments of the present invention.

FIG. 4 depicts a calculation circuit 400 that may be used to implement coefficient and target calculation circuit 390 where the channel bit density is estimated based upon digital samples 317 and the corresponding known pattern. Where calculation circuit 400 is used in place of coefficient and target calculation circuit 390, digital samples 317 are connected to digital samples 402, decoded output 352 or a received known pattern is connected to ideal output 404, CBD estimate 398 is connected to a CBD estimate 498, coefficient values 392 are connected to a coefficient output 492, and target values 394 are connected to a target output 494. Calculation circuit 400 includes an equalizer circuit 410 that equalizes digital samples 412 to yield an equalized output 412 (y) using interim coefficients 415 (e.g., $[f_0, f_1, f_2, \ldots f_{N-1}]$), and a target filter circuit 420 applies a target filtering algorithm to ideal output 404 to yield a target output 422 (d) using interim values 425 (e.g., $[1, h_1, h_2, \ldots h_{M-1}]$), target output 422 is subtracted from equalized output 412 by a summation circuit 430 to yield an error value 435.

Error value 435 is provided to a coefficient and target value calculation circuit 440. Coefficient and target value calculation circuit 440 is operable to calculated updated interim coefficients 415 and interim values 425 to drive error value 435 toward zero. Such calculations are done based upon the following definitions relying on Toeplitz matrices denoted using Matlab™ notation:

$$\vec{y} = T_x \vec{f},$$

$$\vec{d} = T_a \vec{h},$$

$$T_x = \text{Toeplitz}(x(N:\text{end}), x(N:-1:1)), \text{ and}$$

$$T_a = \text{Toeplitz}(a(M:\text{end}), a(M:-1:1)).$$

where $T_x$ is an array of the samples received as digital samples 402, $T_a$ is an array of the values received as ideal output 404, $\vec{f}$ are interim coefficients 415 and $\vec{h}$ is interim values 425. Based upon the aforementioned definitions, values for both interim coefficients 415 and interim values 425 are calculated to render the following equations true, again using Matlab™ notation:

$$\begin{pmatrix} \vec{f} \\ \vec{h}(2:\text{end}) \end{pmatrix} = T_{x,a} / T_a(:, 1) \equiv (T_{x,a}^T \cdot T_{x,a})^{-1} \cdot T_a(:, 1)$$

$$T_{x,a} \equiv [Tx, Ta(:, 2:\text{end})].$$

The resulting values of $\vec{f}$ are provided as coefficient output 492 and the resulting values of $\vec{h}$ are provided as target output 494.

A CBD calculation circuit 450 calculates an estimated channel bit density that is provided as CBD estimate 498. Calculating the estimated channel bit density relies upon an auto correlation calculated in accordance with the following equation:

$$R(j) = \sum_{i=-N}^{N} h(i)h(j-1),$$

where N corresponds to the number of samples on either side of a pulse (i.e., the distance from the peak of the pulse) used for the auto correlation. Based upon the calculated auto correlation, a width of the pulse at one half of the peak value (i.e., 0.5 Peak_Pulse) is determined. From this, an estimated channel bit density ($CBD_{R(h)}$) is calculated in accordance with the following equation:

$$CBD_{R(h)} = \frac{0.5 \text{ Peak\_Pulse}}{T_{bit} \cdot \sqrt{2}},$$

where $T_{bit}$ is a period of the bit rate at which the medium is read or at which data from the medium is received. This estimated channel bit density is provided as CBD estimate 498.

Figure 5:
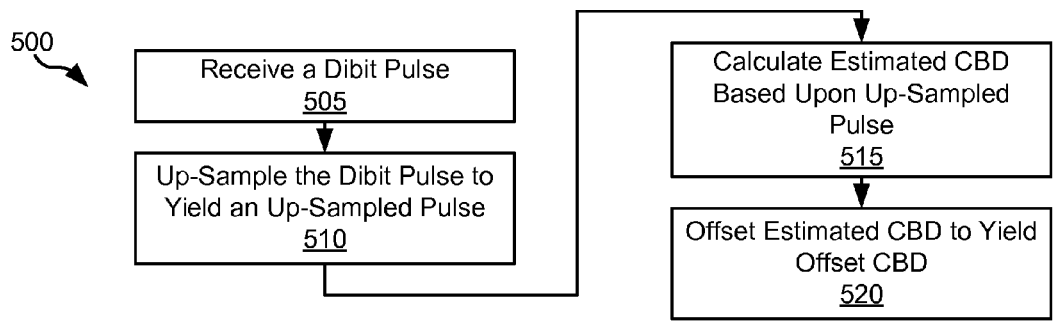
FIG. 5 is a flow diagram showing one method in accordance with some embodiments of the present invention for CBD estimation.

Turning to FIG. 5, a flow diagram 500 shows one method in accordance with some embodiments of the present invention for CBD estimation. Following flow diagram 500, a Dibit pulse is received (block 505). An example of such a Dibit pulse is shown as pulse 705 of a timing diagram of FIG. 7. The received Dibit pulse is up-sampled (i.e., over sampled) using a sampling clock with a frequency that is some multiple of the bit rate at which a medium is read or at which data from the medium is received (block 510). This up-sampling yields a un-sampled pulse. The Dibit pulse corresponds to a sampling rate L, and the up-sampled or over-sampling rate is Q. The over-sampling (OSR) is thus defined by the following equation:

$$OSR = Q/L.$$

Using the over-sampled Dibit pulse (OS_Pulse), an estimated channel bit density (CBD') may be calculated in accordance with the following pseudocode:

```
CBD' = 0; //initialize the estimated channel bit density//
For i = 0 to n {      //repeat over all samples corresponding to the
Dibit pulse //
    If (OS_Pulse[i] > 0.5 Peak_Pulse){
        CBD' = CBD' + OS_Pulse/Peak_Pulse;
    }
    CBD' = CBD'/OSR.
}
```

(block 515). In the preceding pseudocode, the Peak_Pulse corresponds to the maximum value of OS_Pulse over the interval for i=0 to i=n, and the 0.5 Peak_Pulse corresponds to the width of the pulse at the one half peak value. The Peak Pulse corresponds to the "Peak" identified on pulse 700 of FIG. 7, and the 0.5 Peak Pulse corresponds to a width 710 of pulse 700 of FIG. 7. The estimated channel bit density (CBD') may exhibit some offset from an actual channel bit density. In some cases, the channel may be tested to determine the fixed offset by measuring actual channel bit density and comparing it with the first estimate of channel bit density. This fixed offset remains substantially constant over a range of operating conditions. Once established, an offset channel bit density (CBD") may be calculated in accordance with the following equation:

$$CBD'' = CBD' + \text{Fixed Offset}.$$

(block 520).

Figure 6:
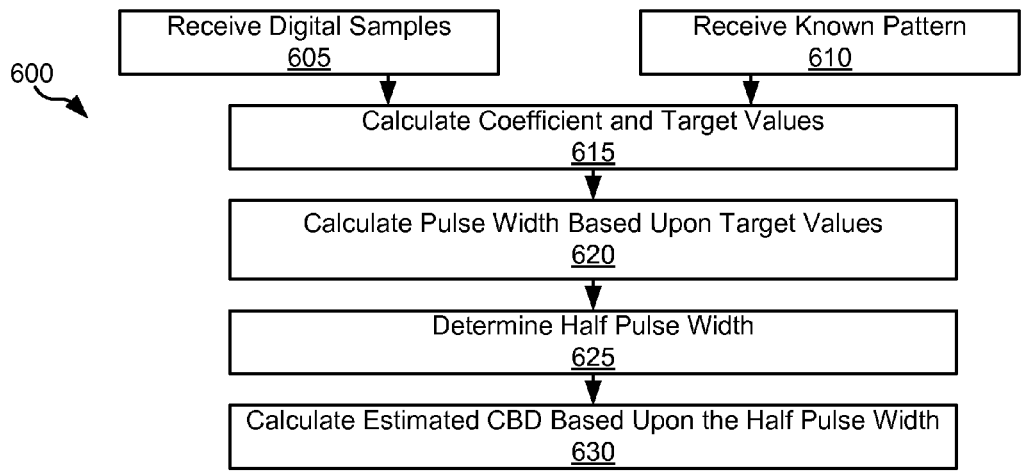
FIG. 6 is a flow diagram showing a method in accordance with other embodiments of the present invention for CBD estimation.

Turning to FIG. 6, a flow diagram 600 shows a method in accordance with other embodiments of the present invention for CBD estimation. Following flow diagram 600, digital samples are received (block 605) along with a corresponding known pattern (block 610). In some embodiments of the present invention, the digital samples are received from an analog to digital converter circuit that converts a received analog signal to yield the digital samples. The analog signal may be derived from a channel such as, for example, a wireless communication channel, a wired communication channel, a magnetic storage medium, an optical storage medium, or the like. Based upon the disclosure provided herein, one of ordinary skill in the art will recognize a variety of channels from which the analog signal is derived. The corresponding known pattern is the expected result from the channel and may be provided by an external source, or may be derived from the digital samples after data detection and data decoding is applied to the digital samples.

Coefficient ($\vec{f}$) and target ($\vec{h}$) values are calculated based upon the digital samples and the corresponding known pattern (block 615). These calculations may be done by applying an equalizing algorithm to the received digital samples using coefficient values ($\vec{f} = [f_0, f_1, f_2, \ldots f_{N-1}]$), and by applying a target filtering algorithm to the known pattern using target values ($\vec{h} = [1, h_1, h_2, \ldots h_{M-1}]$). Calculating updated values for coefficient ($\vec{f}$) and target ($\vec{h}$) values is done based upon the following definitions relying on Toeplitz matrices denoted using Matlab™ notation:

$$\vec{y} = T_x \vec{f},$$

$$\vec{d} = T_a \vec{h},$$

$$T_x = \text{Toeplitz}(x(N:\text{end}), x(N:-1:1)), \text{ and}$$

$$T_a = \text{Toeplitz}(a(M:\text{end}), a(M:-1:1)).$$

where $T_x$ is an array of the receive digital samples, and $T_a$ is an array of the known pattern values. Based upon the aforementioned definitions, updated values coefficient ($\vec{f}$) and target ($\vec{h}$) are calculated to render the following equations true, again using Matlab™ notation:

$$\begin{pmatrix} \vec{f} \\ \vec{h}(2:\text{end}) \end{pmatrix} = T_{x,a} / T_a(:,1) \equiv (T_{x,a}^T \cdot T_{x,a})^{-1} \cdot T_a(:,1)$$

$$T_{x,a} \equiv [T_x, T_a(:, 2:\text{end})].$$

The resulting values of $\vec{f}$ are provided as a coefficient output and the resulting values of $\vec{h}$ are provided as target output.

A pulse width at half of the peak is calculated based upon the target values ($\vec{h}$) (block 620). An example of a pulse represented by the digital samples is shown as pulse 705 of a timing diagram of FIG. 7, and a pulse width 710 at half of the "peak" is also shown on FIG. 7. The pulse width is calculated based upon an auto correlation calculated in accordance with the following equation:

$$R(j) = \sum_{i=-N}^{N} h(i) h(j-1),$$

where N corresponds to the number of samples on either side of a pulse (i.e., the distance from the peak of the pulse) used for the auto correlation. Based upon the calculated auto correlation, a width of the pulse at one half of the peak value (e.g., 0.5PW 710) is determined (block 625). From this, an estimated channel bit density ($CBD_{R(h)}$) is calculated in accordance with the following equation:

$$CBD_{R(h)} = \frac{1/2 PW}{T_{bit} \cdot \sqrt{2}},$$

where $T_{bit}$ is a period of the bit rate at which the medium is read or at which data from the medium is received (block 630).

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for limiting the effects of non-linear distortion and/or reducing signal to noise ratio variation. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a channel bit density estimation circuit operable to:
   receive a pulse derived from a channel exhibiting a first sample rate;
   up-sample the pulse at a second sample rate to yield an up-sampled pulse;
   calculate a first estimated channel bit density of the channel based on the up-sampled pulse; and
   add a fixed offset to the first channel bit density to yield a second channel bit density.

2. The data processing system of claim 1, wherein calculating the estimated channel bit density comprises:
   determining a width of the pulse corresponding to approximately one half of a peak value of the up-sampled pulse; and
   calculating the estimated channel bit density based on the width.

3. The data processing system of claim 1, wherein the second sample rate is an integer multiple of the first sample rate.

4. The data processing system of claim 1, wherein the fixed offset corresponds to a calibrated difference between the first estimated channel bit density and an actual channel bit density.

5. The data processing system of claim 1, wherein the data processing system is implemented as part of a storage device, and wherein the channel includes a storage medium.

6. The data processing system of claim 1, wherein the data processing system is implemented as part of a communication device, and wherein the channel includes a communication medium.

7. The data processing system of claim 1, wherein the data processing system is implemented as part of an integrated circuit.

8. A method for channel bit density estimation, the method comprising:
   receiving a pulse derived from a channel exhibiting a first sample rate;
   up-sampling the pulse at a second sample rate to yield an up-sampled pulse; and
   calculating a first estimated channel bit density of the channel based on the up-sampled pulse; and
   adding a fixed offset to the first channel bit density to yield a second channel bit density.

9. The method of claim 8, wherein calculating the estimated channel bit density comprises:
   determining a width of the pulse corresponding to approximately one half of a peak value of the up-sampled pulse; and
   calculating the estimated channel bit density based on the width.

10. The method of claim 8 wherein the second sample rate is an integer multiple of the first sample rate.

11. A data storage device, the device comprising:
    a storage medium;
    a read/write head assembly operable to sense information from the storage medium and to provide a corresponding continuous signal;
    an analog to digital converter circuit operable to sample the continuous signal synchronous to a sampling clock to yield a set of digital samples;
    a channel bit density estimation circuit operable to:
    receive a Dibit pulse derived from a channel including the storage medium exhibiting a first sample rate;
    up-sample the Dibit pulse at a second sample rate to yield an up-sampled pulse;
    calculate a first estimated channel bit density of the channel based on the up-sampled pulse; and
    add a fixed offset to the first channel bit density to yield a second channel bit density.

12. The device of claim 11, wherein calculating the estimated channel bit density comprises:
    determining a width of the Dibit pulse corresponding to approximately one half of a peak value of the up-sampled pulse; and
    calculating the estimated channel bit density based on the width.

13. The device of claim 11, wherein the second sample rate is an integer multiple of the first sample rate.

14. The device of claim 11, wherein the fixed offset corresponds to a calibrated difference between the first estimated channel bit density and an actual channel bit density.

15. The device of claim 11, wherein the storage medium is a magnetic medium.

16. A data communication device, the device comprising:
    a receiver operable to:
    receive information from a communication medium; and
    provide a continuous signal corresponding to the information;
    an analog to digital converter circuit operable to sample the continuous signal synchronous to a sampling clock to yield a set of digital samples;
    a channel bit density estimation circuit operable to:
    receive a Dibit pulse derived from a channel including the communication medium exhibiting a first sample rate;
    up-sample the Dibit pulse at a second sample rate to yield an up-sampled pulse;
    calculate a first estimated channel bit density of the channel based on the up-sampled pulse; and
    adding a fixed offset to the first channel bit density to yield a second channel bit density.

17. The device of claim 16, wherein calculating the estimated channel bit density comprises:
    determining a width of the Dibit pulse corresponding to approximately one half of a peak value of the up-sampled pulse; and calculating the estimated channel bit density based on the width.

18. The device of claim 16, wherein the second sample rate is an integer multiple of the first sample rate.

19. The device of claim 16, wherein the fixed offset corresponds to a calibrated difference between the first estimated channel bit density and an actual channel bit density.

20. The storage device of claim 11, wherein the channel bit density estimation circuit is implemented as part of an integrated circuit.

21. The storage device of claim 11, wherein the channel bit density estimation circuit and the analog to digital converter circuit are implemented as part of an integrated circuit.

22. The communication device of claim 16, wherein the channel bit density estimation circuit is implemented as part of an integrated circuit.

\* \* \* \* \*